United States Patent [19]

Hessert et al.

[11] 3,971,440

[45] July 27, 1976

[54] METHOD FOR TREATING SUBTERRANEAN FORMATIONS WITH CELLULOSE ETHER-POLYACRYLAMIDE AQUEOUS GELS

[75] Inventors: James E. Hessert; Richard L. Clampitt, both of Bartlesville, Okla.

[73] Assignee: Phillips Petroleum Company, Bartlesville, Okla.

[22] Filed: Sept. 10, 1975

[21] Appl. No.: 611,751

[52] U.S. Cl................................ 166/270; 166/274; 175/65; 166/294; 166/308
[51] Int. Cl.[2]................ E21B 33/138; E21B 43/22; E21B 43/26; C09K 7/00
[58] Field of Search ........... 166/270, 274, 273, 275, 166/294, 295, 281, 308; 175/65; 252/8.5 A, 8.5 C

[56] References Cited
UNITED STATES PATENTS

| | | | |
|---|---|---|---|
| 3,396,790 | 8/1968 | Eaton | 166/270 |
| 3,668,122 | 6/1972 | Branscum | 252/8.5 A |
| 3,727,687 | 4/1973 | Clampitt et al. | 166/274 |
| 3,749,172 | 7/1973 | Hessert et al. | 166/274;270 X |
| 3,762,476 | 10/1973 | Gall | 166/270 X |
| 3,785,437 | 1/1974 | Clampitt | 166/281 |
| 3,818,998 | 6/1974 | Hessert | 166/294 X |
| 3,845,822 | 11/1974 | Clampitt et al. | 166/294 X |
| 3,900,069 | 8/1975 | Sarem | 166/274 |
| 3,909,423 | 9/1975 | Hessert et al. | 166/270 X |

*Primary Examiner*—Stephen J. Novosad

[57] ABSTRACT

Improvements in secondary recovery operations for the recovery of oil, and improvements in well drilling operations, are accomplished through the use of aqueous gels exhibiting high gel strength prepared from water and a mixture of (a) at least one cellulose ether, e.g., carboxymethyl cellulose, and (b) at least one polyacrylamide.

11 Claims, No Drawings

METHOD FOR TREATING SUBTERRANEAN FORMATIONS WITH CELLULOSE ETHER-POLYACRYLAMIDE AQUEOUS GELS

This invention relates to new aqueous gels exhibiting improved physical properties and uses thereof, e.g., the plugging or sealing of fractures in formations.

The secondary recovery of oil from oil-bearing subterranean formations by fluid drive processes wherein a fluid is injected into the formation via one or more injection wells to drive the oil through the formation to one or more production wells is a well-known process. Fluids used in such processes include liquids, such as water and various hydrocarbons, and gases such as steam, hydrocarbon gases, carbon dioxide, etc. Many oil reservoirs comprise layers or zones of porous rock which can vary in permeability from more than 1,000 millidarcys to less than 10 millidarcys. In all fluid drive processes, a recognized problem is the predilection of the drive fluid to channel along or through the more permeable zones of the formation. This is commonly referred to as fingering. The more conductive zones, after the oil has been largely displaced therefrom, function as "thief zones" which permit the drive fluid to channel directly from injection to production wells. In many instances, such channeling or fingering results in leaving substantial quantities of oil in the less permeable zones of the formation which are bypassed. Such channeling or fingering can occur when the mobility, i.e., the quotient of the reservoir's permeability to the drive fluid divided by the viscosity of the drive fluid, becomes large relative to the mobility of the reservoir oil.

Drilling fluids used in the drilling of oil wells, gas wells, and similar boreholes are commonly aqueous liquids containing clays or other colloidal materials. The drilling fluid serves as a lubricant for the bit and drill stem, as a carrying medium for the cuttings produced by the drill bit, and assists in the formation of a filter cake on the wall of the borehole for the reduction of fluid losses to the surrounding subsurface strata. Generally, drilling fluids require the presence of agents which increase the viscosity and gel strength of the fluid in order that it may carry out these functions.

The present invention provides a solution for the above-described problems and other problems related thereto. We have now discovered a class of new aqueous gels having an excellent balance of physical properties which can comprise at least a portion of the aqueous medium used in secondary recovery operations, in fracturing fluids and the aqueous medium used in well drilling operations.

According to the invention, we have found that water-soluble or water dispersible mixtures of cellulose ethers and polyacrylamides, when used in combination with a water-soluble compound of a polyvalent metal which can be reduced to a lower valence state, and a suitable reducing agent capable of reducing said polyvalent metal to said lower valence state can be used as gelling agents to gel aqueous mediums comprising water. We have discovered that by varying the composition and/or amounts of said gelling agents, and/or the conditions under which they are used in forming the gels, a wide range of aqueous gels ranging from liquid highly mobile gels to rigid gels exhibiting high gel strength can be produced.

The aqueous gels of the invention are particularly useful in operations wherein a fluid medium is introduced into a borehole in the earth, e.g., in the above-described secondary recovery operations, in the above-described well drilling operations, in well completion operations, as fracturing fluids, packer fluids, etc.

The term "polymer", as used herein, is employed generically to include both homopolymers and copolymers and the term "water dispersible polymers", as used herein, is employed to include those polymers which are truly water-soluble and those which are dispersible in water or the aqueous medium to form stable colloidal suspensions which can be crosslinked as described herein.

This invention resides in a method wherein a fluid medium is introduced into a borehole in the earth and into contact with a subterranean formation penetrated by said borehole. At least a portion of said fluid medium comprises an aqueous gel, and said gel comprises water to which there has been added: a water thickening amount of a water-soluble mixture of (a) at least one cellulose ether and (b) at least one polyacrylamide; a sensible amount of a water-soluble compound of a polyvalent metal wherein the metal present is capable of being reduced to a lower polyvalent valence state and which is sufficient to gel water when the valence of at least a portion of the metal is reduced to a lower valence state; and an amount of a water-soluble reducing agent which is effective to reduce at least a portion of the metal to a lower valence state.

In a preferred embodiment, according to the invention, an aqueous gel is prepared from a polymeric mixture of (a) at least one water-soluble cellulose ether, e.g., carboxymethyl cellulose, and (b) at least one water-soluble polyacrylamide wherein the amount of cellulose ether present in the mixture of polymers ranges from about 40 to about 90 weight percent, based on total polymers present, with the balance of the aqueous gel being water, a water-soluble compound of a polyvalent metal oxidizing agent, and a water-soluble reducing agent.

If desired, filler materials such as silica flour, diatomaceous earth, ground nutshells, finely divided natural sands, clay or clay-like materials such as Illite clay and kaolin, and finely divided plastic particles such as Microethene, etc., can be incorporated in the aqueous gels used in the practice of the invention.

In general, any of the water-soluble cellulose ethers can be used in the practice of the invention. Cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkylcarboxyalkyl celluloses such as ethylcarboxymethyl cellulose; and hydroxyalkylalkyl celluloses such as hydroxypropylmethyl cellulose; and the like. Many of the cellulose ethers are available commercially in various grades.

The carboxy-substituted cellulose ethers are available as the alkali metal salt, usually the sodium salt. However, the alkali metal is seldom referred to and they are commonly referred to as CMC, CMHEC, etc. For example, water-soluble CMC is available in various degrees of carboxylate substitution ranging from about 0.3 up to 3.0. In general, CMC having a degree of substitution in the range of 0.65 to 0.95 is preferred.

Frequently, CMC having a degree of substitution in the range of 0.85 to 0.95 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. The degree of substitution of CMC is commonly designated in practice as CMC-7, CMC-9, CMC-12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 0.4 or higher.

In general, the polyacrylamides used to carry out this invention have a molecular weight of about 200,000 to about 16 million with from 2 percent to about 75 percent, preferably from about 3 to about 40 percent, of the amide groups being hydrolyzed to carboxyl groups. The hydrolysis of acrylamide polymer is accomplished by reacting the same with sufficient aqueous alkali, e.g., sodium hydroxide to hydrolyze between about 2 to about 75 percent of the amide groups present in the polymer molecule. The resultant product comprises a long carbon chain, to alternate carbon atoms of which there are attached either amide or carboxyl groups. Polymers in which less than about 14 percent of the amide groups have been hydrolyzed are considered to be more useful with high salinity waters than those polymers having a higher degree of hydrolysis.

Polymers of acrylamide which contain the above-described amounts of carboxyl groups can, alternatively, be prepared by copolymerization of a mixture of acrylamide and acrylic acid.

Small amounts of the mixture of polymers will usually produce liquid mobile gels which can be readily pumped whereas large amount of the mixture will usually produce stiff rigid gels. If desired, said stiff gels can be "thinned" by dilution to any desired concentration of the mixture of cellulose ether and polyacrylamide. This can be done by mechanical means, e.g., stirring, pumping, or by means of a suitable turbulence-inducing device, such as a jet nozzle.

Crosslinking agents which can be used in the practice of the invention are water-soluble compounds of polyvalent metals wherein the metal is present in a valence state which is capable of being reduced to a lower valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of metal-containing compounds used in the practice of the invention will be a sensible amount, i.e., a small but finite amount which is more than incidental impurities, but which is effective or sufficient to cause subsequent gelation when the metal in the polyvalent metal compound is reduced to a lower valence state. The lower limit of the concentration of the starting metal-containing compound will depend upon several factors including the particular type of cellulose ether and polyacrylamide mixture used, the concentration of said mixture in the water to be gelled, the water which is used, and the type of gel product desired. For similar reasons, the upper limit on the concentration of the starting metal-containing compound also cannot always be precisely defined. As a general guide, the amount of the starting polyvalent metal-containing compound used in preparing aqueous gels in accordance with the invention will be in the range of from 0.05 to 60, preferably 0.5 to 30, weight percent of the amount of the total polymer mixture used. Those skilled in the art can determine the amount of starting polyvalent metal-containing compound to be used by simple experiments carried out in the light of this disclosure. For example, we have discovered that when brines, such as are commonly available in producing oil fields, are used as the water in preparing gels in accordance with the invention, less of the starting polyvalent metal-containing compound is required than when distilled water is used. Gelation rates are frequently faster when using brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled in accordance with the invention.

Suitable reducing agents which can be used in the practice of the invention include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others, for example, sodium thiosulfate usually reacts slowly in the absence of heat, e.g., requiring heating to about 50°C. The presently most preferred reducing agents are sodium hydrosulfite or sodium bisulfite.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be at least 150, preferably at least about 200, weight percent of the stoichiometric amount required to reduce the metal in the starting polyvalent to said lower valence state, e.g., +6 Cr to +3 Cr. Those skilled in the art can determine the amount of reducing agent to be used by simple experiments carried out in the light of this disclosure.

The mixture of at least one cellulose ether and at least one polyacrylamide, is necessary to form the gels of this invention. In the polymeric component mixture of this invention, the cellulose ether component of the mixture comprises in the range of about 25 to about 95 percent by weight, preferably about 40 to about 90 percent by weight, more preferably about 60 to about 80 weight percent, of the polymeric component mixture. The polymeric mixture will comprise in the range of 0.0025 to 5 weight percent, preferably 0.025 to 2 weight percent of the aqueous gel, based on the weight of water.

The proportions of the two polymer types which provide a gel strength improvement will depend somewhat on the total polymer concentration in the aqueous gel. For example, at a 0.25 weight percent (2500 ppm) total polymer level, substantial improvements in gel strengths have been observed when 60-90 weight percent of the polymeric component was a soluble cellulose ether. At a 1 (one) weight percent (10,000 ppm) total polymer level, gel strength improvements were observed when a cellulose ether represented 30–80 weight percent of the polymeric components. In any event, gel strength-improving proportions of the two polymer types will be used in the improved compositions and processes of the present invention.

Various methods can be used for preparing the aqueous gels of the invention. Either the polyvalent metal-containing compound or the reducing agent can be first added to a solution of the polymeric mixture of at least one cellulose ether and at least one polyacrylamide in water or other aqueous medium, or the metal-containing compound and the reducing agent can be added simultaneously to a solution or an aqueous medium containing the polymeric mixture. Generally speaking, where convenient, the preferred method is to first disperse the polymer mixture in the water or other aqueous medium. The reducing agent is then added to the dispersion with stirring. The metal-containing compound is then added to the solution or aqueous medium containing the cellulose ether and polyacrylamide and the reducing agent, with stirring. Gelation starts as soon as reduction of some of the higher valence metal in the starting polyvalent metal-containing compound to a lower valence state occurs. The newly-formed lower valence metal ions, for example +3 chromium obtained from +6 chromium, effect rapid crosslinking of the polymer mixture and gelation of the solution or aqueous medium containing same.

One presently preferred method of preparing the aqueous gels is to prepare the gel while the components thereof are being pumped into the well. This method comprises preparing a base solution of the cellulose ether and polyacrylamide, adding to this base solution (a) a polyvalent metal compound such as sodium dichromate or (b) a reducing agent such as sodium thiosulfate or sodium bisulfite, pumping the base solution down the well and into the fracture, and during pumping adding to said base solution the other of the reagents (a) and (b) which was not previously added thereto. It is also within the scope of the invention to incorporate all the components of the aqueous gel into a stream of water while it is being pumped, e.g., into a well. For example, CMC and polyacrylamide can be added first to the flowing stream of water and the other components added subsequently in any suitable order. Turbulent flow conditions in the pipe will provide proper mixing.

It is also within the scope of the invention to prepare a dry mixture of the cellulose ether-acrylamide polymers, the metal-containing compound and the reducing agent, in proper proportions, and then add this dry mixture to the proper amount of water.

An advantage of the invention is that ordinary ambient temperatures and other conditions can be used in practically all instances in preparing the aqueous gels of the invention or aqueous mediums containing same. However, in some instances, a small amount of heat may be desirable to aid in the formation of the gel, e.g., heating to a temperature of about 50°C.

Aqueous gels in accordance with the invention can be prepared having a wide range of viscosities or firmness ranging from low viscosity or highly mobile gels having a relatively low viscosity up to firm or rigid gels which are non-mobile. The choice of gel viscosity or concentration will depend upon the use to be made of the gel. The actual viscosity and/or gel strength of the gel will depend upon the type and concentration of cellulose ether-acrylamide polymer mixture, the type and amount of starting polyvalent metal compound used, and the type and amount of reducing agent used.

One procedure which can be used to prepare the gels is to prepare a relatively concentrated or high viscosity gel and dilute same to a viscosity or concentration suited for the actual use of the gel. In many instances, this procedure results in a more stable gel.

Herein and in the claims, unless otherwise specified, the aqueous gels of the invention are defined for convenience, and not by way of limitation, in terms of the amount of the mixture of cellulose ether and polyacrylamide contained therein, irrespective of whether or not all the mixture is crosslinked. For example, a 1 weight percent or 10,000 ppm gel is a gel which was prepared from a starting mixture solution which contained 1 weight percent or 10,000 ppm by weight of the mixture of cellulose ether and polyacrylamide. The same system is employed for the gels prepared by the above-described dilution technique.

As indicated above, the aqueous gels of the invention are particularly useful in fluid drive operations for the secondary recovery of oil. The gels of the invention are applicable to decreasing the mobility of a drive fluid, such as water, or decreasing the permeability of formations prior to or during secondary recovery operations, such as fluid drive processes, and also for water shutoff treatments in producing wells. In one embodiment of the invention, a conventional waterflood or gas drive is carried out in conventional manner until the drive fluid breaks through into the production well in excessive amounts. A gel of the invention is then pumped down the well and into the formation in any suitable manner, any suitable amount, and for any desired period of time sufficient to obtain the desired in-depth penetration and decrease in mobility of the drive fluid, or decrease in permeability of the high permeability zones of the formation. Usually, an in-depth penetration of from 10 to 1,000, preferably 75 to 900, feet from the injection well will be sufficient. However, this can vary from formation to formation and penetrations outside said ranges can be used. For example, there can be injected into the formation via the injection well from about 0.001 to about 0.5 pore volume of a gel in accordance with the invention over a suitable period of time ranging from one day to six months. Or, the injection of the gel can be carried out by injecting a slug of about 200 to 5,000 barrels of gel into the well and then into the formation. Injection in one of the above manners will provide a flood front adjacent the oil to be produced. If desired, an ordinary brine or water can then be employed to drive this slug or band or front of gel on through the formation to the production well. If desired, in order to avoid any sharp demarcations in viscosity or mobility of the gel, which could adversely affect the relative mobility of the flood medium and the oil, and cause channeling, the viscosity or concentration of the gel can gradually be lessened through a series of incremental decreases rather than discontinuing the injection thereof abruptly.

In another embodiment of the invention, the formation can be treated prior to carrying out the fluid drive secondary recovery operations. This embodiment is particularly applicable where there is a good knowledge of the nature of the formation. Thus, in a formation where the oil-bearing strata are interspersed with more permeable porous strata which contain no oil, or an insufficient amount of oil to make secondary recovery operations economical, but which more permeable strata would still act as a thief zone, the formation can be treated in accordance with the invention prior to initiating the fluid drive operation.

In still another embodiment, the invention can be applied to producing wells, either oil wells or gas wells, where there is a more porous nonhydrocarbon-bearing strata adjacent the hydrocarbon-bearing strata. For example, such a condition can exist where there is a water sand adjacent the hydrocarbon-bearing sand and the water intrudes into the borehole and interferes with the production of hydrocarbon. In such instances, the formation can be treated in accordance with the invention to shut off the flow of water. The method of carrying out such a water shutoff treatment is substantially the same as described above in connection with fluid drive operations.

It is also within the scope of the invention to carry out the gel injection techniques of the invention periodically or intermittently, as needed, during the course of a fluid drive secondary operation, or during the production of oil from a producing well.

In all of the above operations, the injection of the gel of the invention can be carried out in conventional manner. If desired, a gel of suitable viscosity or concentration can be injected as the drive fluid per se. Gels injected in accordance with the invention can be prepared in advance, stored in suitable tanks, and then pumped into the well. Or, said gels can be formed in a conduit leading to the injection well, or in the tubing in the well itself, and then injected into the formation. Thus, the required amounts of the mixture of cellulose ether-polyacrylamide, polyvalent metal compound, and reducing agent can be metered into the tubing in the well, mixed therein, and then injected into the formation. If desired, selected portions of the formation can be isolated mechanically, as by the use of packers, and other means known to the art, for treatment in accordance with the invention.

The aqueous gels of the invention can comprise, or can be employed as, drilling fluids in the drilling of wells in any manner known to the art for the use of drilling fluids. Such gels can be employed without the addition of other materials thereto. However, if desired, weighting agents such as barium carbonate, barium sulfate, amorphous silica, etc., can be included in the drilling fluids comprising said aqueous gels. If desired, other additives compatible with the aqueous gels can also be included in the drilling fluid. Thus, the drilling fluids can include clays such as bentonite, attapulgus clay, fluid loss agents, etc. It should be understood that not all of these additives or constituents will necessarily be present in any one drilling fluid and that the amount of any particular additive used will be governed by the other constituents present under the particular well conditions existing. As indicated, in selecting such additives for use in a particular drilling fluid, care should be taken to avoid materials which are not compatible with the aqueous gels. The use of such additives will be governed in part by the viscosity and fluid loss properties desired in the drilling fluid. Thus, as is the situation in connection with conventional drilling fluids, pilot tests should be run to determine the properties desired for the aqueous gel used as the drilling fluid, or an aqueous gel containing one of the above-described additives, to determine the optimum results or properties desired for the drilling fluid under the particular well conditions existing.

The following examples will serve to further illustrate the invention.

EXAMPLES

A series of runs was made to illustrate the formation of aqueous gels in accordance with the invention and to demonstrate the increase in gel strength obtained with the inventive mixtures of cellulose ethers and acrylamide polymers. In the series of runs, aqueous gels were prepared with different concentrations of the individual polymers and mixtures of the polymers. Specifically, gels were made with total polymer concentrations of 2,500 ppm, 5,000 ppm, and 10,000 ppm. In each series of runs the amount of each polymer in the mixtures was varied by 10 percent ranging from 0 to 100 percent for each.

The individual solutions were prepared by adding varying amounts of the polymers to water and adding varying amounts of $NaHSO_3$ and varying amounts of $Na_2Cr_2O_7 \cdot 2H_2O$, both of which were dissolved in water. The mixtures were stirred and allowed to form gels. Stable gels were formed in each instance.

In the first series of runs, 2,500 ppm of polymer, either polyacrylamide alone or carboxymethyl cellulose alone or mixtures thereof, were gelled with sodium bisulfite and sodium dichromate. The amount of sodium dichromate used was 500 ppm and the amount of sodium bisulfite used was 750 ppm. The gel strength for the various gels prepared was evaluated.

The results for this series of runs are set forth below in Table I.

TABLE I

| GELS FROM MIXTURES OF POLYACRYLAMIDE AND CARBOXYMETHYL CELLULOSE AT 2500 ppm TOTAL POLYMER | | |
|---|---|---|
| Solution No. | CMC (wt.%) | Polyacrylamide (wt.%) | Gel Strength (lb/100 ft$^2$)* |
| 1 | φ | 0 | 1201 |
| 2 | 90 | 10 | 3242 |
| 3 | 80 | 20 | 900 |
| 4 | 70 | 30 | 1661 |
| 5 | 60 | 40 | 1801 |
| 6 | 50 | 50 | 600 |
| 7 | 40 | 60 | 380 |
| 8 | 30 | 70 | 110 |

TABLE I-continued

GELS FROM MIXTURES OF POLYACRYLAMIDE
AND CARBOXYMETHYL CELLULOSE
AT 2500 ppm TOTAL POLYMER

| Solution No. | CMC (wt.%) | Polyacrylamide (wt.%) | Gel Strength (lb/100 ft²)* |
|---|---|---|---|
| 9 | 15 | 85 | 6.67 |
| 10 | 0 | 100 | 6.67 |

*Gels were aged 18 hours at room temperature.

The above data in general demonstrate that polymer mixtures (2500 ppm total polymer) containing in the range of about 60 to about 90 weight percent of a cellulose ether such as carboxymethyl cellulose (CMC) and 40 to 10 weight percent polyacrylamide give gels with greater gel strengths than the gels obtained from solutions of CMC alone or polyacrylamide alone.

In another series of runs 5,000 ppm of total polymer, either polyacrylamide or carboxymethyl cellulose, or mixtures thereof, was gelled using 1,000 ppm sodium dichromate and 1,250 ppm sodium bisulfite. The gel strengths of these samples are given in Table II.

TABLE II

GELS FROM MIXTURES OF POLYACRYLAMIDE
AND CARBOXYMETHYL CELLULOSE
AT 5000 ppm TOTAL POLYMER

| Solution No. | CMC (wt.%) | Polyacrylamide (wt.%) | Gel Strength (lb/100 ft²)* |
|---|---|---|---|
| 1 | 100 | 0 | 2550 |
| 2 | 90 | 10 | 3100 |
| 3 | 80 | 20 | 4600 |
| 4 | 70 | 30 | 4500 |
| 5 | 60 | 40 | 5100 |
| 6 | 50 | 50 | 3200 |
| 7 | 40 | 60 | 1200 |
| 8 | 30 | 70 | 923 |
| 9 | 20 | 80 | 848 |
| 10 | 10 | 90 | 193 |
| 11 | 0 | 100 | 43.5 |

*Gels were aged 18 hours at room temperature.

The above data demonstrate that polymer mixtures (5000 ppm total polymer) containing in the range of about 50 to about 80 weight percent of a cellulose ether such as carboxymethyl cellulose (CMC) and 50 to 20 weight percent polyacrylamide give gels with greater gel strengths than the gels obtained from solutions of CMC alone or polyacrylamide alone.

In another series of runs, 10,000 ppm of total polymer, either polyacrylamide or carboxymethyl cellulose, or mixtures thereof, was used to form gels using 1,500 ppm sodium dichromate and 2,000 ppm sodium bisulfite. The gel strengths of these samples are given in Table III.

TABLE III

GELS FROM MIXTURES OF POLYACRYLAMIDE
AND CARBOXYMETHYL CELLULOSE
AT 10,000 ppm TOTAL POLYMER

| Solution No. | CMC (wt.%) | Polyacrylamide (wt.%) | Gel Strength (lb/100 ft²)* |
|---|---|---|---|
| 1 | 100 | 0 | 6470 |
| 2 | 90 | 10 | 6830 |
| 3 | 80 | 20 | 10672 |
| 4 | 70 | 30 | 15808 |
| 5 | 60 | 40 | 13674 |
| 6 | 50 | 50 | 14000 |
| 7 | 40 | 60 | 12006 |
| 8 | 30 | 70 | 10672 |
| 9 | 15 | 85 | 10000 |
| 10 | 0 | 100 | 9338 |

*Gels were aged 18 hours at room temperature.

The above data demonstrate that polymer mixtures (10,000 ppm total polymer) containing in the range of about 30 to about 80 weight percent of a cellulose ether such as carboxymethyl cellulose (CMC) and 70 to 20 weight percent polyacrylamide give gels with greater gel strengths than the gels obtained from solutions of CMC alone or polyacrylamide alone.

The CMC used in the runs of Tables I–III was sodium carboxymethyl cellulose (Hercules CMC-9H) having a degree of substitution of about 0.9.

The polyacrylamide used in the runs of Tables I–III was Polyfloc Hi-Vis obtained from Betz Laboratories, Inc. having a degree of hydrolysis of about 27–32 percent.

The runs in Tables I—III illustrate the unexpectedly high gel strength obtained with a gelled mixture of polyacrylamide and carboxymethyl cellulose especially when the amount of carboxymethyl cellulose present in the polymer mixture ranges from 40 to 90 weight percent.

The apparatus employed in making gel strength determinations comprises a modification of a standard Model 35 Fann V-G meter, manufactured by Geophysical Machine Works, Houston, Texas. In modifying said Fann V-G meter, the conventional viscosity measuring cup, sleeve, and bob were removed. An adapter shaft was then removably attached at its upper end to the lower end of the regular torque shaft to which said viscosity measuring bob is normally attached. The upper end of said torque shaft is not altered and is connected in its normal manner to the torque measuring components of the Fann V-G meter. A cylindrical shear bob having a diameter of ½ inch, a length of 1–½ inches, and having a spindle shaft extending therethrough was provided. The surface of said shear bob is roughened, knurled, or etched for purposes described hereinafter. Said spindle shaft was adapted at its upper end to be removably attached to the lower end of said adapter shaft. The lower end of said spindle shaft extends through said shear bob for a purpose described hereinafter. A vertically adjustable sample holder comprising a platform mounted on the shaft of a motor having a speed of rotation of 1 rpm was positioned below said regular torque shaft.

In preparing for a test, the roughened surface of the shear bob is covered with a thin absorbent paper fixed to said surface with a thin coat of rubber cement. A steel spacer element having a hole in the center thereof is placed in the bottom of a 100 ml beaker. Next, approximately 85 to 90 ml of the newly mixed gel to be tested, and which was prepared as described above, is placed in said beaker. The paper-covered shear bob is then placed in the gel in the beaker with the lower end of said spindle shaft in the hole in said steel spacer. A plastic spacer element having a hole in the center thereof is then placed over the upper end of said spindle shaft and floats on the surface of said gel. The purpose of said spacer elements is to insure that the shear bob is maintained centered in the gel while the gel is forming and aging. The gel strength can then be measured as described below. However, in most instances, it is preferred to allow the gel to age for a specified period to develop gel strength. Any suitable aging period, depending upon the concentration and other properties of the gel, can be used. Usually, periods up to about 24 hours are sufficient. The gels of Tables I, II, and III were aged about 18 hours. During said aging period, the paper on the surface of the shear bob absorbs the gelling solution as gelation occurs, with consequent formation of gel within the pores of the paper, and thus provides a firm bond between the gel and the shear bob.

After aging, the beaker containing the gel and the shear bob positioned therein is firmly mounted on the rotatable platform by means of a piece of carpet tape having adhesive on both sides thereof. The upper spacer element is removed and the upper end of the shear bob spindle shaft is connected to the lower end of the adapter shaft which is then connected at its upper end to the lower end of the Fann meter torque shaft. The motor which normally drives said sleeve, as in viscosity measurements, is not used in these tests. The one rpm motor driving the sample platform is then started and the torsion dial in the top of the Fann V-G meter is observed. As the beaker is rotated, there is an increase in the readings of said dial. The rotation of said beaker is a function of time. For example, after ½ minute the beaker will have rotated 80°. The shear bob in the gel resists this rotation due to the gel strength of the gel. The dial in the top of the Fann meter measures this resistance in degrees of tension applied against the calibrated spring in the Fann meter torque measuring mechanism. When the gel strength of the gel is exceeded and the gel ruptures, said dial reading immediately decreases. The maximum reading at this point is recorded and employed in the following formula to calculate the gel strength:

$$G_2 = 100\ K_s \theta / r_b A_b$$

where $G_s$ is the gel strength, in lbs./100 ft$^2$ $K_s$ is torsional spring constant, in ft.lbs./degree (converted from Dyne cm/degree as furnished by spring manufacturer)

$\theta$ is a dial reading, in degrees $r_b$ is the radius of the shear bob, in feet $A_b$ is the area of the shear bob, in feet$^2$ Since the curved surface of the cyclindrical shear bob is covered with an absorbent paper, the area of the ends of the shear bob is ignored in making calculations. A range of springs having different constants (stiffness) is available commercially for the Fann V-G meter. By employing springs having different degrees of stiffness, one can measure gel strengths over a range of from about 5 to 20,000 lbs./100 ft$^2$. On the modified Fann Viscometer it is easy to position an individual gel sample in the instrument and a measurement requires only one to two minutes to complete.

The tables show that a gel can be tailor-made from mixtures of cellulose ethers and acrylamide polymers for a particular application with control of gel strength for meeting the desired properties for the purpose intended.

Other modifications and alterations of this invention will become apparent to those skilled in the art from the foregoing discussion and examples and it should be understood that this invention is not to be unduly limited thereto.

We claim:

1. In a method wherein a fluid medium is introduced into a borehole in the earth and into contact with a subterranean formation penetrated by said borehole, the improvement wherein at least a portion of said fluid medium comprises an aqueous gel, and wherein said gel comprises water to which there has been added:

a water-thickening polymeric mixture of (a) at least one cellulose ether and (b) at least one acrylamide polymer wherein the amount of (a) present in the mixture ranges from about 25 to about 95 weight percent of the total amount of (a) plus (b);

a sensible amount of a water-soluble compound of a polyvalent metal wherein the metal present is capable of being reduced to a lower valence state and which is sufficient to gel said water when the valence of at least a portion of said metal is reduced to said lower valence state; and an amount of a water-soluble reducing agent which is effective to reduce at least a portion of said metal to said lower valence state.

2. A method according to claim 1 wherein said aqueous gel comprises water to which there has been added:

from 0.0025 to 5 weight percent of said polymeric mixture based upon the weight of said water and wherein the amount of (a) in the mixture ranges from about 40 to about 90 weight percent based upon the total amount of (a) plus (b);

from 0.05 to 60 weight percent of said polyvalent metal compound based upon the weight of said mixture; and from 0.1 to at least about 200 percent of the stoichiometric amount of said reducing agent required to reduce said polyvalent metal to said lower valence state.

3. A method according to claim 2 wherein said polyvalent metal compound is selected from the group consisting of ammonium chromate, ammonium dichromate, the alkali metal chromates and dichromates, chromium trioxide, and mixtures thereof, and said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof.

4. A method according to claim 1 wherein said polymeric mixture comprises carboxymethyl cellulose ether and polyacrylamide.

5. A method according to claim 1 wherein:

said borehole comprises an injection well;

said formation comprises an oil-bearing formation and is also penetrated by a production well;

said method is a fluid drive process carried out for the recovery of oil from said formation by injecting a drive fluid into said formation via said injection well and driving oil to said production well; and said fluid medium comprising said aqueous gel is introduced into said injection well and into the pores of said formation.

6. A method according to claim 5 wherein:

said formation is of nonuniform permeability and comprises at least one zone of relatively high permeability and at least one zone of relatively low permeability; and said fluid medium is injected into said formation prior to injecting drive fluid into said formation via said injection well in said fluid drive process for driving said oil to said production well.

7. A method according to claim 6 wherein said aqueous gel comprises water to which there has been added:

from 0.025 to 2 weight percent of said polymeric mixture based upon the weight of said water;

from 0.5 to 30 weight percent of said polyvalent metal compound based upon the weight of said mixture; and from 0.5 to at least about 150 percent of the stoichiometric amount of said reducing agent required to reduce said polyvalent metal to said lower valence state.

8. A method according to claim 5 wherein:

said formation is of nonuniform permeability and comprises at least one zone of relatively high permeability and at least one zone of relatively low permeability; and said fluid medium is injected into said formation subsequent to having injected a drive fluid into said formation via said injection well in said fluid drive process for driving said oil to said production well.

9. A method according to claim 8 wherein said aqueous gel comprises water to which there has been added:

from 0.025 to 2 weight percent of said polymeric mixture based upon the weight of said water;

from 0.5 to 30 weight percent of said polyvalent metal compound based upon the weight of said mixture; and from 0.5 to at least about 150 percent of the stoichiometric amount of said reducing agent required to reduce said polyvalent metal to said lower valence state.

10. A method according to claim 1 wherein:

said method comprises a method for drilling said borehole into the earth;

a drill bit is actuated in said borehole in contact with said formation and penetrates same in the presence of said fluid medium; and said fluid medium, together with formation solids entrained therein, is removed from said borehole.

11. A method according to claim 10 wherein said aqueous gel comprises water to which there has been added:

from 0.0025 to 5 weight percent of said polymeric mixture based upon the weight of said water;

from 0.05 to 60 weight percent of said polyvalent metal compound based upon the weight of said mixture; and from 0.1 to at least about 200 percent of the stoichiometric amount of said reducing agent required to reduce said polyvalent metal to said lower valence state.

* * * * *